March 26, 1957 E. S. SAFFORD ET AL 2,786,669
ELECTRICAL WEIGHING OR MEASURING APPARATUS
Filed Dec. 1, 1951 3 Sheets-Sheet 1
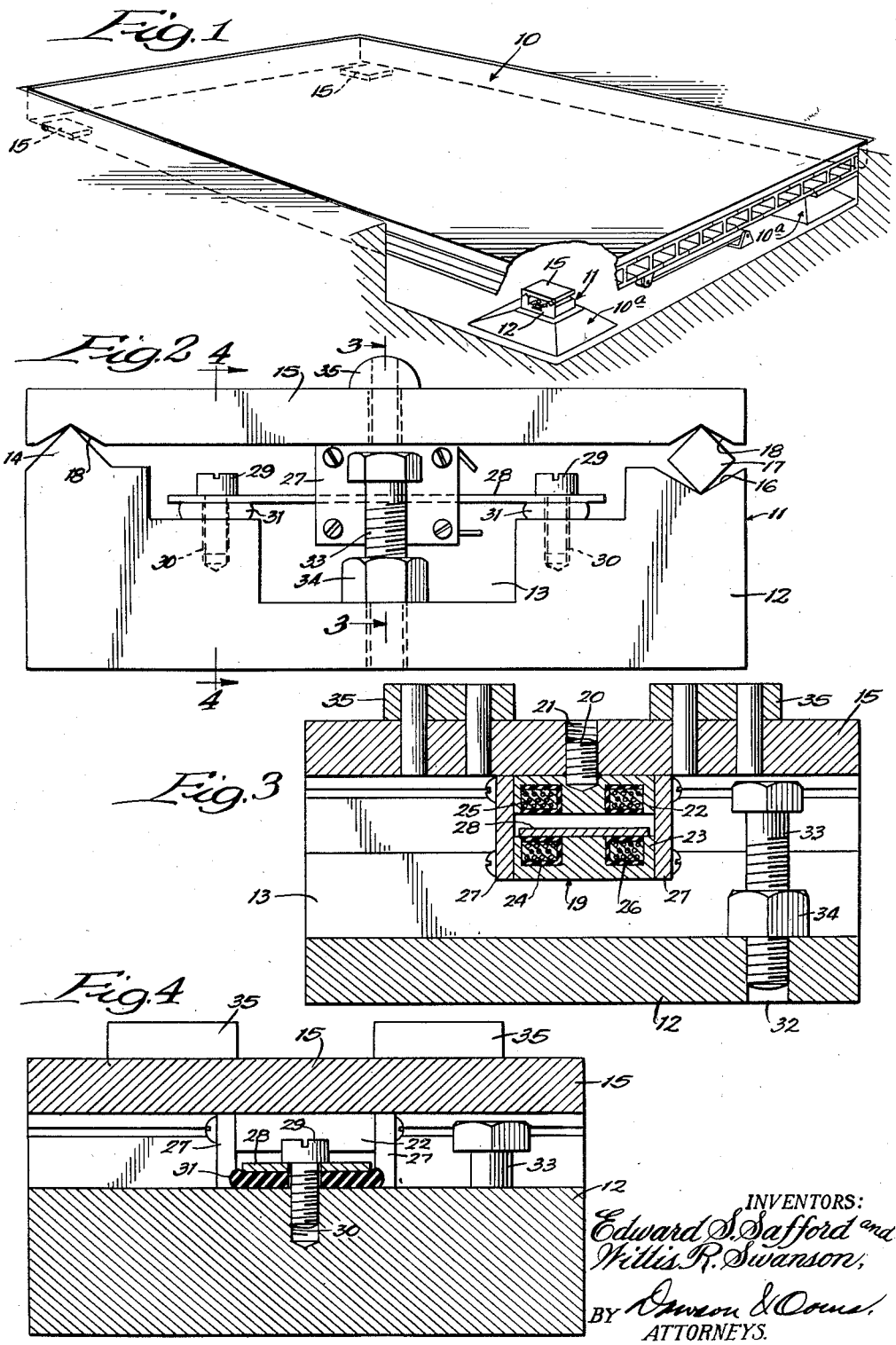
INVENTORS:
Edward S. Safford and
Willis R. Swanson,
BY Dawson & Ooms
ATTORNEYS.

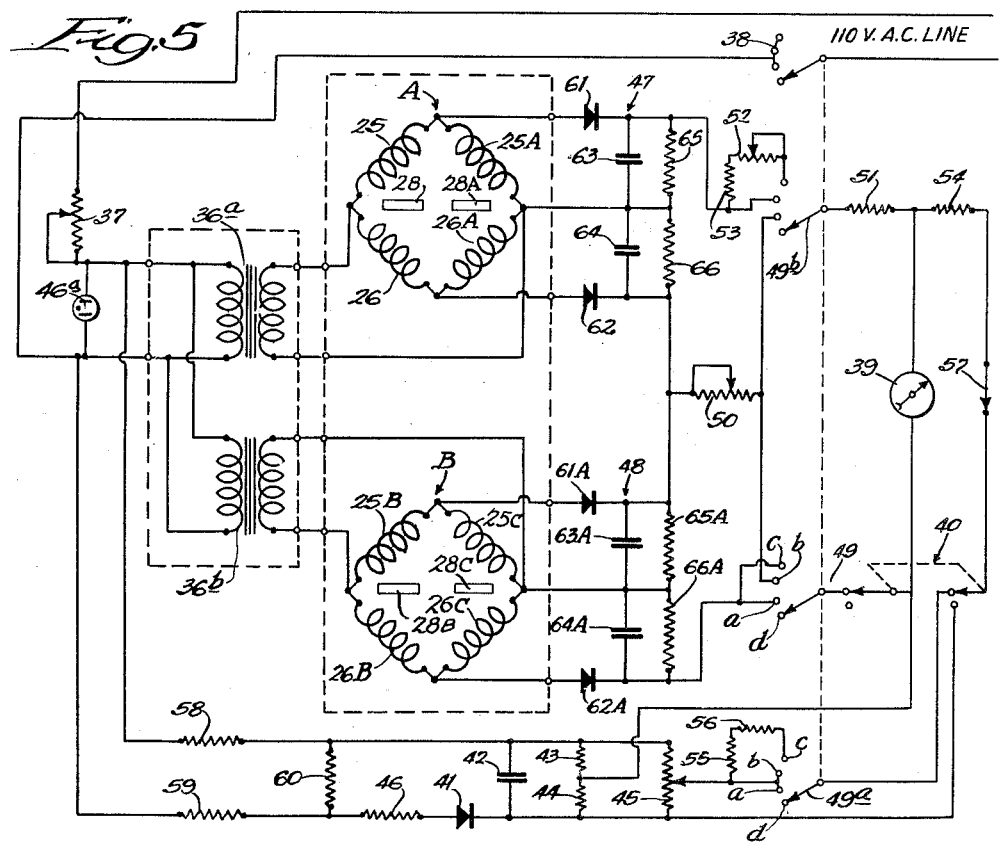

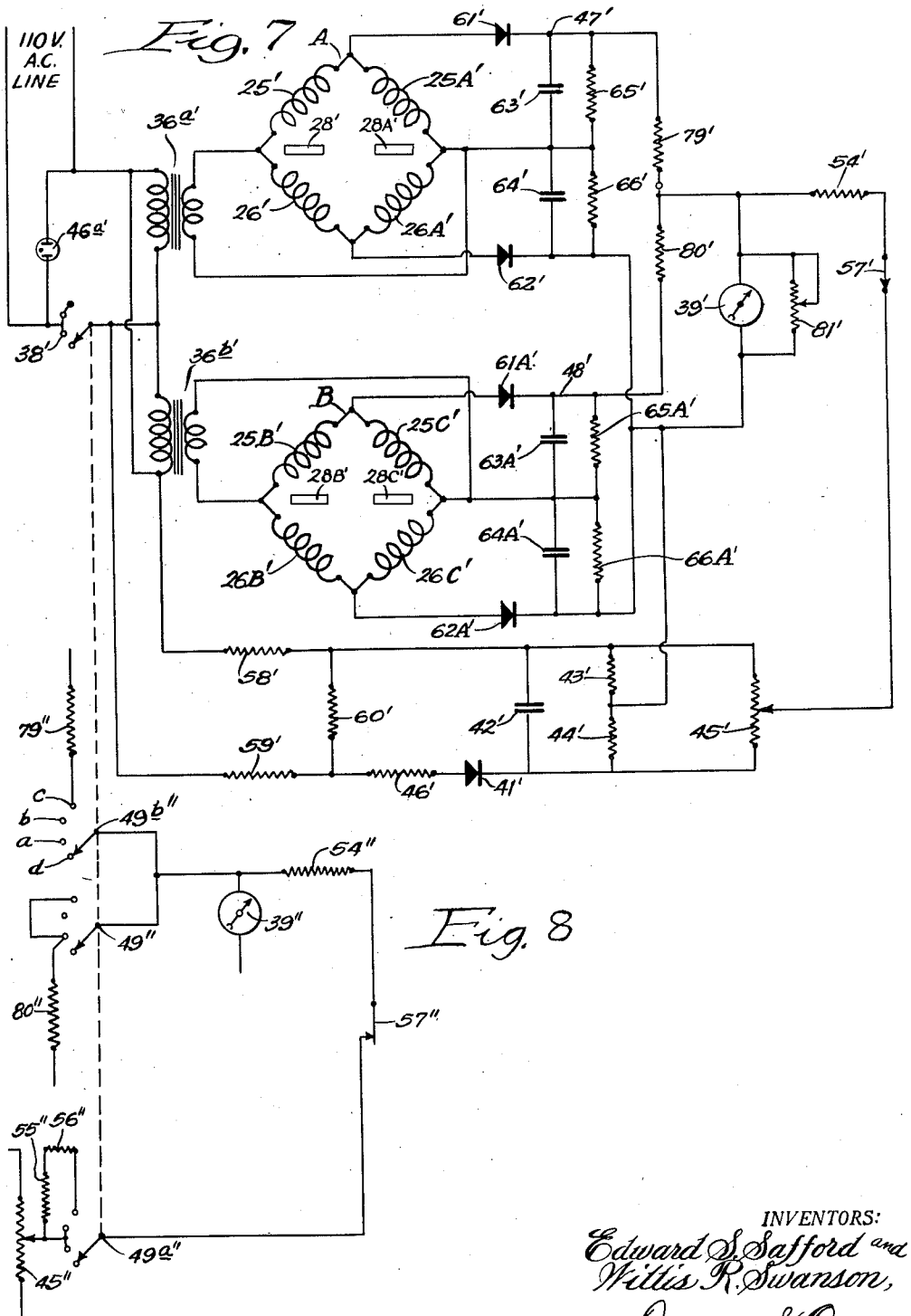

United States Patent Office 2,786,669
Patented Mar. 26, 1957

2,786,669

ELECTRICAL WEIGHING OR MEASURING APPARATUS

Edward S. Safford and Willis R. Swanson, Wichita, Kans., assignors, by mesne assignments, to Control Cells Corporation, Inc., Wichita, Kans., a corporation of Kansas Application December 1, 1951, Serial No. 259,466

7 Claims. (Cl. 265—70)

This invention relates to an electrical weighing or measuring apparatus, and is useful in making temperature, pressure, weight, force, linear deflection, etc. measurements.

An object of the invention is to provide electrically operated weighing or measuring apparatus in which weights can be determined, centers of gravity of loads ascertained and other weights or measurements accomplished in a minimum of time. A still further object is to provide platform apparatus for determining weights, overloads, etc. A further object is to provide mechanism for attachment to the spring brackets of trucks or other vehicles for determining loads, etc. A still further object is to provide mechanism which may be attached to aircraft to determine landing gear loads and the center of gravity of the loads. A still further object is to provide such mechanism which may be employed with tracks receiving railroad cars for determining axle loads, etc. A still further object is to provide a thermostat device for determining temperature variations through the use of a temperature-varying air gap. Yet another object is to provide a weigh scale device in which sorting and selection of objects may be accomplished in a minimum of time where weight is the criterion. Another object is to provide weighing apparatus for weighing ships in dry dock. Still another object is to provide weighing apparatus by which vehicle weights can be determined as rapidly as vehicles can be driven onto a weigh platform, the spring-back and oscillation of ordinary scales and corresponding delay being eliminated. A further object is to provide electrically operated apparatus for determining weights, centers of gravity, etc. for commercial and pleasure vehicles in all classes of transportation. Still another object is to provide a safety apparatus by which loads, temperatures, pressures or linear deflections may be interpreted, either as a visual record or as a means of actuating through electrical circuits, safety cut-offs at predetermined points, or a combination of both of these features.

A specific object of this invention is to provide electrical weighing and measuring apparatus in which hysteretic effects are substantially eliminated. Another specific object of this invention is to provide weighing apparatus in which the percentage of error of weight indications is substantially eliminated. A still further specific object of this invention is to provide weighing apparatus of very small size, and which is readily portable. A still further object is to provide an electric circuit for use in electrical weighing apparatus in which the weights on individual weighing devices may be summarized to indicate a total load. Another object is to provide a circuit in which tare weights may be added or subtracted electrically from the total load so that either gross weight or net weight may be indicated as desired. Another object of this invention is to provide electrical indicating means through which loads are readily and accurately determined. Still another object is to provide a safety stop to prevent damage to the parts from excessive weights.

Still another object is to provide simple and accurate adjustable means to compensate for asymmetry in the weight sensitive elements.

Other objects and advantages will appear as the specification proceeds.

The invention is shown in an illustrated embodiment by the accompanying drawings in which—

Fig. 1, a perspective view of a weighing platform structure embodying the invention; Fig. 2, a side view in elevation of the load cells positioned under each corner of the weighing platform; Fig. 3, a detailed sectional view, the section being taken as indicated at line 3—3 of Fig. 2; Fig. 4, a sectional view, the section being taken as indicated at line 4—4 of Fig. 2; Fig. 5, a schematic view showing the wiring layout; Fig. 6, a schematic view showing a wiring layout of an indicator circuit which may be used with the circuit shown in Fig. 5; Fig. 7, a modification of the wiring diagram shown in Fig. 5; and Fig. 8, a modification to show a selective switching arrangement for the circuit of Fig. 7.

In the embodiment of the invention illustrated in Figs. 1 to 5 inclusive, 10 designates a weighing platform of any suitable construction for supporting a vehicle or other object to be weighed. Under each corner of the weighing platform 10 is a load cell 11.

The load cell 11 consists of a base or support member 12 having a recessed central portion 13. The base 12 has a knife type bearing edge 14 extending across one end adapted to support an end of the deflecting member or load receiving beam 15. Extending across the end of the base 12 opposite the knife edge 14 is a V-groove or channel 16 adapted to support a rock-bar member 17 having a generally square-shaped cross-section along an edge thereof. The beam 15 has a V-shaped groove or channel 18 at each end to receive the knife edge 14 of the base 12 and an edge of the bar 17. Thus, the bar 17 forms a second knife edge support for the beam 15. The member 17 is free to rock within the V-groove or channel 16 of the base member 12 and the V-groove or channel 18 of the beam 15 when a weight is imposed upon beam 15 and it is deflected. The beam is therefore free of longitudinal restraints.

The beam 15 has a core or pole supporting structure 19 rigidly fastened thereto by any suitable means, such as by welding or by means of threaded stud, etc. In the illustrated embodiment of this invention, a threaded stud 20 is welded to the core structure 19 and screwed into a threaded bore 21 provided in the beam 15, thereby securing the core support 19 to the beam 15.

The core supporting structure 19 includes an upper core or pole 22 and a lower core or pole 23. The cores 22 and 23 may be of various shapes and construction, however, in the preferred embodiment of this invention, laminated iron cores are used since such core structure reduce eddy current losses. Each of the core members 22 and 23 is provided with a channel 24 adapted to receive impedence coils or windings 25 and 26 respectively, thus forming the load cell inductances. The core members 22 and 23 have an air gap therebetween and are held in spaced-apart relationship by the vertical side walls 27. Armature 28 is positioned within the air gap between the core members 22 and 23, and is adjustably fastened to the base member 12 by the screws 29 which are received within the threaded bores 30 provided in the base 12. Resilient washers 31 are positioned between the base member 12 and the armature 28 at each end of the armature. The washers 31 urge the armature 28 in an upwardly direction and permit fine adjustment of the screw members 29 against the upward urging of the washers 31 so as to accurately position the armature 28 in the air gap separating the core members 22 and 23. In this manner, any asymmetry in the coil and core structures 22, 25 and 23, 26 may be compensated for.

The base member 12 has a threaded bore 32 in the recessed portion 13 adapted to receive a bolt 33. About the bolt 33 is a nut 34 suitable for locking against the base 12 to hold the bolt 33 in axial adjustment. The bolt 33 serves as a safety stop to prevent excessive downward movement of the beam 15 in the event an overload is imposed upon the beam.

Bearing blocks 35 are secured to the upper surface of the beam 15, and serve as rests upon which the platform 10 is positioned. Any suitable means for securing blocks 35 to the beam 15 may be employed.

Since each of the load cells 11 will support a portion of the total weight supported by the platform 10, it is desirable to add automatically the weights indicated by each of the load-cells so that the total weight of an object placed upon the platform 10 can be readily determined. To accomplish this purpose, a suitable summarizing circuit is employed incorporating each of the load cells. Fig. 5 is a wiring diagram of such a summarizing or adding circuit.

In Fig. 5, the inductances 25 and 26 are in one load-cell 11; the inductances 25A and 26A, 25B and 26B, and 25C and 26C are each in one of the other three load cells. These inductances are connected to form the legs of impedance bridges A and B which are supplied alternating current by transformers 36a and 36b respectively. The transformers 36a and 36b are supplied with power from an alternating current source through a potentiometer 37 and a line switch 38. The potentiometer 37 is used to adjust the line voltage which may be indicated on the meter 39 by depressing push button switch 40. The voltage impressed across the meter 39 during the line test is proportional to the line voltage. The line voltage is rectified by the rectifier 41 and filtered by the condenser 42 prior to being impressed across the meter 39.

The output across the condensor 42 is supplied to a bridge arrangement consisting of resistors 43 and 44, and the potentiometer 45. Maximum unbalance voltage is supplied by this bridge arrangement for line check when the switch 40 is depressed. The resistor 46 is used to limit the peak rectifier current, thereby preventing damage to the rectifier 41. A neon lamp 46a provides a visual indication when the line switch 38 is closed and the circuit is in operation.

Under no load conditions, both bridges A and B are in balance and there is no output from either bridge. This condition is attained in each bridge by equalizing the reluctance of the two coils in each leg of a bridge and such equalizing adjustment is accomplished through adjustment of the armature 28 in each load cell until the two coils 25 and 26 comprising a load cell have equal reluctances. When loaded, armature positioning relative to the two coils in a load cell is changed, causing an increase in the reluctance of one coil and a corresponding decrease in the reluctance of the other coil. Unbalance results in the bridges, and an unbalance voltage is thereby developed across the bridge output, proportional to the degree of movement of the armature within the air gap.

The outputs of the impedance bridges A and B are fed respectively into rectifiers 47 and 48. After rectification in the rectifiers 47 or 48, the voltages are impressed either selectively or additively across the meter 39 depending upon the position of the switch 49. The meter 39 is calibrated in terms of pounds, thus, load cell output is read directly in terms of weight.

If the switches 49, 49a and 49b are in position a, voltage from the rectifier 48 is supplied to the meter 39 through the meter calibrating potentiometer 50 and meter multiplier resistor 51. When the switch 49 is in position b, voltage produced by the rectifier 47 is read on the meter 39, thus giving indication of the load on the load cells forming impedance bridge A. The calibrating potentiometer 50 is adjusted so that a full scale reading on the meter 39 is produced by the maximum load on either cells forming bridge A or cells forming bridge B when read individually. When the switch 49 is in c position, the voltage from the rectifiers 47 and 48 are combined in series so that the individual loads supported on each of the load cells 11 will be totalized and the total weight read on the meter 39. When the switch is in this position, the potentiometer 50 is no longer in series with the meter 39, but instead the resistor 53 and the potentiometer 52, serving as meter multiplier, are placed in series with the meter 39. This permits the maximum totalized loads to be read on the meter 39 as a full scale deflection. When the switch 49 is in position d, the indicator is turned off.

By means of suitable circuits forming a part of this invention, it is possible to add either a negative or positive potential to the load cell outputs impressed across the meter 39, thereby permitting automatic compensation for tare weights. This is somewhat analogous to the screw adjustment of ordinary spring scales. This is important in certain applications where it is desirable to either add a weight to that indicated by the load cells, or in other applications where it may be desired to subtract a weight from that indicated by the load cells. By way of example, where load cells are mounted in the spring brackets of trucks, in order that the gross weight may be indicated, some provision must be made for adding the "unsprung" or tare weight of truck to the weight indicated by the load cells. This is accomplished by adding a voltage equivalent to the unsprung weight of the truck to the voltage from the load cells. In the circuit illustrated, provision is made to obtain such a voltage from the resistors 43 and 44 and the potentiometer 45 through switch 49a. The desired voltage value may be obtained by adjusting the potentiometer 45 until the required value is had, and this voltage is impressed across the meter 39 and thereby added to the load cell outputs.

Also, in weigh scale applications it may be desired to read directly on the meter 39 only the weight of the payload carried by a truck supported upon the weighing platform. The tare weight or weight of the truck is easily subtracted from the load cell outputs by adding a negative voltage taken by suitable connection from the resistor network 43, 44 and 45 to the voltage of the load cells across the meter 39.

When the switch 49a is in the position shown by a or b, this compensating voltage is impressed upon the meter 39 through the meter multiplier resistor 54. When the switch 49a is in the position shown by c, resistors 55 and 56 are in series with the meter 39. In the latter position, one half of the voltage appearing across the meter when the switch 49a is in position a or b is impressed across the meter to allow for the expanded meter scale in this position. The switch 57 is in series with the compensating voltage, and when it is open, the compensating voltage will not appear across the meter 39. This permits adjustment of the impedance bridges A and B for null indication under no load conditions without interference from the compensating voltage. The switch 40 when depressed, disconnects the load cell bridges A and B from the meter 39 so that bridge output voltage will not appear in the line test.

The resistors 58, 59, and 60 form a voltage divider across the voltage supply line furnishing voltage to the diode 41.

Rectifier units 47 and 48 each comprising rectifiers 61 and 62, condensors 63 and 64, and resistors 65 and 66, are employed in the preferred embodiment of the invention. Though addition of the individual load cell signals without rectification and impressing the resultant voltage across a suitable meter is possible, it has been found that simultaneous voltages from a lightly loaded load cell and voltages from a heavily loaded cell are not completely in phase, and when this occurs, direct addition of the two voltages results in inaccuracy. Therefore, rectifiers 47 and 48 are included to rectify the individual load cell signals prior to addition and phase angle difficulties are thereby avoided.

In the preferred embodiment of this circuit the rectifier tubes employed are all germanium diodes. However, other types of rectifying devices such as ordinary diode vacuum tubes, selenium rectifier, etc. may readily be used. The switches 38, 49, and 49a are ganged.

Various types of indicating devices may be used to indicate the load cell outputs. In the embodiment illustrated in Fig. 5, the meter 39 is a microammeter. In Fig. 6, a wiring diagram for a null type indicator used in place of the meter 39 is illustrated. Use of this type of indicator increases the accuracy of the weight indication.

To connect this circuit in the summarizing circuit, terminals T1 and T2 are simply connected in place of the meter 39, and the load cell output is fed to the tube 70 across the resistor 70a. This circuit is composed of a direct coupled amplifier 161 connected as one leg of a bridge circuit whose unbalanced voltage operates an electron ray indicator tube 162. An ordinary full wave power supply is used to supply power to the circuit.

The power supply includes a transformer 163 supplying voltage to a duo-diode tube 164. A switch 165 is used to connect the primary winding of the transformer 163 to an alternate current source. The output voltage of the tube 164 is filtered and dropped across a condensor 166 and a resistor 167.

The output of the power supply is stabilized by the two voltage regulator tubes 168 and 169 which are connected in series. The two voltage regulator tubes form a stable voltage point between them, and serve as the fixed leg of the bridge network. The other leg of the bridge is formed by the two sections of the duo-triode tube 70. Unbalance voltage is developed across the resistor 71 connecting the stable voltage point between the two voltage regulator tubes 168 and 169 and a point on the series connection between the two sections of the duo-triode 70.

When the grids of the two triodes have identical biases, the bridge will be in balance. One section of the tube 70 is biased by the load cell unbalance voltage, this voltage being rectified in the rectifiers 47 and/or 48. This unbalance voltage is then matched by adjusting the finely calibrated potentiometer 72 until null point is indicated by the electron ray tube 162. Voltage supplied to the potentiometer 72 is taken from a separate winding on the power transformer 163, rectified by the diode 73, and filtered through a condensor 74 and a resistor 75.

The electron ray indicator tube 162 is connected in the bridge network, having its cathode connected to the stable voltage point between the tube 168 and 169 through a resistor 76, and its plate connected through a resistor 77 to the juncture of the tube 168 and the tube 70. The indicator tube 162 is normally biased to cut off so that zero grid voltage will cause the indicator shadow to just vanish. The grid of the tube 162 is connected to the opposing point of the bridge. Hence, when the bridge is unbalanced with the grid growing positive, the shadow angle will increase, and when the bridge is unbalanced with the grid growing more negative, the shadow edges overlap and leave a bright section. It is to be understood that the balance or null point might be indicated by a microammeter, a galvanometer, or other suitable devices as well as an electron ray tube. However, in the preferred embodiment of this invention an electron ray tube is used as a null indicator because it is not damaged by large loads that could probably occur in the load cell circuits and, in addition, it is more resistant to mechanical shock.

By the use of the circuit shown in Fig. 6, it is possible to tune the electron ray tube 162 until the arc or shadow just closes. This circuit arrangement permits quick and accurate tuning since the arc of the tube 162 remains open on one side of the balanced point and closed on the other side. Thus, the balanced point can be found directly without the trial and error procedures necessary for conventional "electric eye" bridges. Also, this makes it unnecessary to provide a sensitivity control to sharpen the response as is necessary to adjust the arc for maximum spread as in conventional indicators of this type. The reason for this being that the tube is here used continually at maximum sensitivity.

A modification of the circuit shown in Fig. 5 is illustrated in Fig. 7. This circuit is essentially a parallel current totalizing circuit as distinguished from the series voltage totalizing circuit shown in Fig. 5. In the circuit shown in Figure 7, only the combined loads of the individual cells can be indicated on the meter 39'. However, in the modification of this circuit shown in Fig. 8, provision is made to selectively impress the unbalance voltage of either bridges A or B across the meter 39'', or the combined loads on the individual load cells can be indicated by proper setting of the ganged switches 49'' in the manner previously described with reference to the circuit shown in Fig. 5. A broken line running through the switch 38' of Fig. 7 and the switches of Fig. 8 indicates that all of the switches are ganged, when the modification of Fig. 8 is included in the circuit shown in Fig. 7. In the circuit of Fig. 7, the voltage drop caused by the meter current flowing through the filter load resistors of rectifiers 47 and 48 in the series adding circuit shown in Fig. 5 is substantially eliminated.

It has been found that this modified form of circuit electrically adds the load cell outputs very accurately. This is of importance in highway weigh scale adaptations where maximum permissible error in weight readings, as specified by the U. S. Department of Commerce, is two pounds per 1,000 pounds for all weights over 1,000 pounds.

The circuit consists of imput transformers 36a' and 36b' connected to an alternating current source through a switch 38. The impedances 25'—26', 25A'—26A', 25B'—26B', and 25C'—26C' are connected in a bridge arrangement as previously described in the discussion of the circuit shown in Fig. 5. The output of the bridge A' is fed into a rectifier 47', the output of the bridge B' is fed into rectifier 48'. The outputs of the rectifiers 47' and 48' are impressed across the meter 39' in parallel through isolation resistors 79' and 80'. A compensating voltage of either negative or positive polarity may be added to the load cell outputs as previously described, thereby permitting the meter 39' to indicate only the net or payload weight on a vehicle rather than the gross weight if desired. The amplitude of the added voltage may be set as required through suitable adjustment of the potentiometer 45'. The meter 39' may be calibrated to read full scale deflection for maximum loadings of the load cells by adjusting the potentiometer 81'. The circuit is similar in other respects to that shown in Fig. 5, and it is not believed that a further discussion of the parts and their function in the circuit is necessary.

*Operation*

In operation, a truck or other object to be weighed is placed upon the platform 10. A component of the total weight supported on the platform will be transmitted to each of the four load cells 11. This weight component is transmitted to the beam 15 through the bearing blocks 35. Since the impedance coils 25 and 26 and the cores 22 and 23 are rigidly secured to the beam 15, they move downwardly with the deflection of the beam 15. The armature 28 being positioned in the air-gap separating the two impedance coils, the air-gap spacing between the coil 25 and the armature 28 decreases with downward movement of the beam 15, while at the same time the air-gap spacing between the coil 26 and the armature 28 increases. Thus, the relative change of armature proximity with respect to the two coils, produces an unbalance voltage in the two coils. The degree of unbalance will depend upon the amount of deflection of the beam 15, and this in turn depends upon the weight imposed upon the beam. Therefore, the weight supported upon the platform 10 can be determined by measuring the degree of voltage unbalance in the two coils, and this is done in the circuits.

To place the circuit in operation, the switch 38 is closed, connecting the circuit with the supply line voltage. The switch 40 is depressed to connect the meter 39 across the resistor 44, and the potentiometer 37 is adjusted so that the desired supply voltage, as indicated on the meter 39, is impressed across the circuit. The potentiometer 50 is then adjusted so that the meter 39 reads full scale deflection for maximum load on either the cells comprising the bridge A or B. In the weigh scale application, it is probably desired to indicate on the meter 39 the combined voltages from the load cells A and B. In such case the switch 49 is turned to position c, placing the outputs of the bridges in series and thereby impressing the combined voltage outputs across the meter 39. In this position the meter 39 may be calibrated to read full scale deflection for totalized maximum loads through suitable adjustment of the potentiometer 52. When switch 49 is in position c, the circuit is arranged essentially as a series voltage totalizing circuit and the combined voltage outputs of the cells A and B are added and the total voltage is impressed across the meter 39.

If it is desired to determine the net weight or pay load weight of a truck supported on the weighing platform, the switch 57 is closed and a negative voltage developed in the resistor combination 43, 44 and 45 is added to the load cell outputs across the meter 39. The meter indication will then be the load cell outputs minus a compensating voltage. The compensating voltage is adjusted to equal the tare weight of the truck by adjusting the potentiometer 45 to the suitable setting. Net weight is then instantly indicated on the meter 39.

If the indicator shown in Fig. 6 is used in place of the meter 39, the electron ray tube shadow is adjusted for null point by varying the potentiometer 72. The potentiometer is calibrated in pounds so that when null point is reached the weight supported on the platform may be read directly from the scale of the potentiometer.

It has been found that the deflecting beam 15 must be either entirely free of longitudinal restraints or completely restrained during deflection. If either one or the other of these conditions is not satisfied, an undesirable hysteresis in the deflecting beam results. A hysteresis causes inaccuracy in the coil unbalance voltages and may result in as much as a 40% difference between load increase and decreasing calibration.

To provide complete freedom from longitudinal restraints, the beam 15 is supported on the knife edge 14 and the bar 17. The bar 17 is free to rock during deflection of the beam 15, and freedom of longitudinal movement of the beam 15 is thereby permitted. In this structure, frictional forces tending to retard complete freedom of longitudinal movement are substantially eliminated. Hysteretic effects are then made inconsequential by this construction.

The beam 15 may be of various shapes and may be made from many different materials, and of course, the shape, thickness, and ultimate strength of the beam will be varied to suit different applications. In the preferred embodiment of this invention, the beam 15 is constructed of a steel composition having a high ultimate strength, shaped to have a constant strength cross-section. It is also desirable to employ a steel whose modulus of elasticity is relatively independent of temperature since this will permit greater accuracy in weight determination.

In order to approach a more linear relation of signal voltage to air gap displacement, a balanced magnetic structure having two impedance coils 25 and 26 with an armature 28 arranged in an air gap provided therebetween has been employed in the preferred embodiment of this invention. In addition to increasing the linearity of the system, this "push-pull" type of construction substantially increases the sensitivity over that obtained through use of a single coil type cell. In addition, the entire gap distance can be used for deflection without producing an ambiguous signal since linearity is not appreciably affected by movement of the armature closely to the coil or pole pieces as is the case in single coil structure. This is advantageous because it permits armature positioning in the air gap to compensate for any asymmetry even where zero balance occurs with the armature against one of the pole or core pieces.

It has also been found that hysteresis depends greatly on mechanical construction and the smallest practical construction for the core and coil structures results in less hysteretic effects. In certain applications of the load cell, hysteresis is greatly reduced by securing the core and coil structure as rigidly as possible to the mountings. This is important, for example, where load cells are mounted in the spring brackets of vehicles.

The effectiveness of the positive safety stop and the advantages it provides stem, to a great extent from the use of the "push-pull" type of coil construction described above. Since in such a structure the entire gap distance separating the two coils 25 and 26 can be used for deflection, a deflecting member or beam 15 may be employed which will deflect a relatively large distance. If this relatively large deflection were not made possible, a safety stop of this type could not be successfully employed because of the infinitesimal distance that the beam would be deflected. In the weigh scale application, while a vehicle is driven onto the weigh platform the weight is unevenly distributed on the various load cells. This may result in overloading one of the cells, and without suitable overload protection the circuit, indicating device, and the load cell structure would have to be constructed to withstand such overloads, otherwise they would be damaged. The load capacity of all of these elements would, then, have to be greatly in excess of their normal operating range. This would mean that the elements would normally operate at a fraction of capacity and sensitivity as well as accuracy would be greatly decreased.

To utilize the entire air gap for deflection of the armature, the reluctance of the two coils should be equal when the armature is against or nearly against the pole piece of the lower coil if zero unbalance is to occur at no load. The upper coil must, then, have an intrinsic reluctance greater than that of the lower coil. This condition may be brought about in several ways, but the most simple is to add a few turns to the upper coil winding. The exact number of turns to add will depend upon the particular installation, that is, width of the air gap, supply voltage and current applied, coil size, etc.

Positioning the armature near the lower pole piece when in unloaded condition permits a ready modification of the indicating arrangement that is particularly adapted to applications where it is desired to have greater accuracy at one region of the indicating scale than at other regions. Since a line voltage change of 1%, for example, causes approximately a 1% error in the indicator reading and since small errors may occur even though the line voltage is checked before and after each reading and though voltage stabilizers are used (virtually all voltage stabilizers produce wave form distortion that is just as serious as voltage variations), errors resuling from line voltage variations can be substantially eliminated for one region of the indicating scale by having zero unbalance occur at some predetermined value within the region where accuracy is desired. In the modification, the armature is positioned near one pole piece in the unloaded condition, and consequently the zero signal occurs at some predetermined load. To have some extra margin of reading above the point on the scale indicating the predetermined load, a meter where the rest or no load position is near the center of the scale is used and by introducing a bucking voltage corresponding to the predetermined load signal which will buck back the meter to its no load position, the meter would pass a voltage corresponding to the bucking voltage or maximum deflection. For example, if the predetermined load was 32,000 lbs., for a 50,000 lbs. load the meter would pass through the zero signal point and indicate —18,000 equivalent voltage units if a meter was used where the rest position is near the center of the scale.

By use of the summarizing circuits embodied in this invention, the weights or forces applied to any number of individual load cells may be totalized or selectively indicated. Each additional pair of load cells employed will be connected in a bridge network having its own rectifier and current source. Thus, in a dry dock application for weighing ships and determining the center of gravity, only these circuit additions need be made.

Use of the weighing apparatus embodying this invention permits great rapidity in the repetition rate at which different weights may be determined. Since only a fraction of a second is necessary after each weighing operation to allow the load cell to return to normal no-load condition, time delay between loadings is non-existent. Too, since weights are rapidly determined, in applications where vehicle weights are taken, a vehicle need barely come to a stop while on the weighing platform.

Either or both indicating or recording meters may be used with the circuits, and if recording instruments are employed, permanent and continuous records can be made, use may be made of such records in establishing traffic control plans.

Meter and circuit components can be contained in a compact portable unit while the coils and armature varying structure may be installed as a permanent unit. By providing suitable jack and plug arrangements, the one indicating unit is then used with many coil assemblies. Application of this feature can be made where load cells are mounted in the spring brackets of trucks.

While in the foregoing specification, structure and circuits have been described in a specific embodiment in considerable detail for purposes of illustration, it is understood that various details of both can be modified widely by those skilled in the art without departing from the spirit of this invention.

We claim:

1. An assembly adapted to produce variations in an electric current accurately corresponding to the magnitude of the force imposed thereon, comprising a base member, a beam supported on said base member by means permitting said beam to freely deflect toward said base member, said means also permitting said beam to freely elongate during the deflection thereof, said beam being floatingly supported by said means but otherwise unconstrained, an upper coil having a core therein of magnetic metal for producing a magnetic field of pre-determined strength, a second coil having a core therein of magnetic metal positioned below said first-mentioned core and coil in spaced-apart relation to provide an air gap therebetween, said lower coil and core being adapted to produce a second magnetic field of substantially lesser strength than the magnetic field produced by the upper coil and core, whereby the plane along which said magnetic fields are in balanced opposition can be closer to said lower coil and core than to said upper coil and core, and an armature of magnetic metal within said air gap normally lying adjacent the lower coil and core, whereby the entire air gap between said upper and lower coils may be used for movement of said armature with the result that less sensitive indicators may be used to respond to the current change.

2. An assembly adapted to produce variations in an electric current corresponding to the force imposed thereon, said assembly being substantially free of influencing hysteretic effects whereby the response is accurate within close tolerances, comprising a base member, a beam supported on said base member by means permitting said beam to deflect freely towards said base member, said means also permitting said beam to freely elongate during the deflection thereof, said beam being freely supported upon said means so that it is otherwise unconstrained, an upper coil having a core therein of magnetic metal for producing a magnetic field of predetermined strength, a second coil having a core therein of magnetic metal positioned below said first-mentioned core and coil in spaced-apart relation to provide an air gap therebetween, said lower coil and core adapted to produce a second magnetic field of lesser strength than the magnetic field produced by the upper coil and core, whereby the plane along which said magnetic fields are in balanced opposition can be closer to said lower coil and core than to said upper coil and core, and an armature of magnetic metal within said air gap normally lying adjacent the lower coil and core, whereby said magnetic fields are in balanced opposition when the force imposed upon said assembly is equal to a predetermined value, and the entire air gap between said upper and lower coils may be used for movement of said armature.

3. In an assembly for producing variations in an electric current corresponding to the magnitude of a force imposed thereon, a base, a beam supported upon said base at spaced points and having the characteristic of deflecting downwardly when a force is applied thereto, an upper coil having a core therein for producing a magnetic field of predetermined strength, a second coil having a core therein positioned in spaced relation below said upper coil to define therewith an air gap therebetween, said lower coil and core being constructed and arranged to produce a second magnetic field of lesser strength than that produced by the upper coil and core whereby the plane along which said magnetic fields are in balanced opposition is closer to said lower coil and core than to said upper coil and core, and an armature positioned within said air gap and normally being in closer proximity with the lower than the upper coil and core and in the aforementioned plane along which the magnetic fields are in balanced opposition, said coils and cores and said armature being carried respectively by said beam and base.

4. In apparatus for measuring the magnitude of a force, a base, a beam having at least portions thereof movable with respect to the base, a pair of inductance coils carried by said beam and being oriented in spaced apart relation with respect to each other to define an air gap therebetween, and an armature carried by said base and being positioned within said air gap, one of said coils being constructed and arranged to provide a magnetic field of substantially lesser strength than the magnetic field produced by the other whereby the plane along which said magnetic fields are in balanced opposition is closer to the coil producing the magnetic field of lesser strength, said armature normally being positioned along such plane.

5. In apparatus adapted for use in measuring the magnitude of an applied force, a pair of spaced apart induction coils and an armature interposed therebetween, said coils and armature being adapted to be shifted with respect to each other in accordance with the magnitude of a force being measured to change the reluctance of the coils by an amount proportionate to the magnitude of the force being measured, one of said coils being characterized by producing a magnetic field of lesser strength than the magnetic field produced by the other coil whereby the plane along which said magnetic fields are in balanced opposition is closer to the coil of lesser strength, and said armature normally lying in such plane, whereby in the measurement of the magnitude of an applied force substantially the entire space between said coils may be used for movement of said armature.

6. In measuring apparatus of the character described, a pair of spaced apart induction coils, an armature positioned for influencing the reluctance of said coils, said pair of coils and armature being movable with respect to each other, and means for shifting the relative positions of said pair of coils and armature in accordance with the magnitude of a quantity to be measured by said device, one of said coils being characterized by producing a magnetic field of lesser strength than that of the other whereby the plane along which the magnetic fields are in balanced opposition is closer to the coil producing the magnetic field of lesser strength, said armature being normally positioned along that plane of balanced opposition.

7. In a measuring device of the character described, a pair of induction coils spaced apart to define an air gap therebetween, an armature mounted within said gap, said pair of coils and said armature being movable with respect to each other within the limits of said gap for changing the reluctance of the coils, and means for effectuating relative movement between said pair of coils and armature in proportion to the magnitude of a quantity to be measured by said device whereby the respective reluctances of said coils is changed in proportion thereto, one of said coils being characterized by producing a magnetic field of lesser strength than the other of said coils so that the plane of balanced opposition between said coils is adjacent the one producing the field of lesser magnetic strength, said armature being normally oriented along such plane of balanced opposition.

References Cited in the file of this patent

UNITED STATES PATENTS

| | | |
|---|---|---|
| 2,298,216 | Lamberger | Oct. 6, 1942 |
| 2,406,221 | Hornfeck | Aug. 20, 1946 |
| 2,411,023 | Bruns | Nov. 12, 1946 |
| 2,419,217 | Isenberg | Apr. 22, 1947 |
| 2,473,578 | Edelman | June 21, 1949 |
| 2,499,033 | Oberholtzer | Feb. 28, 1950 |
| 2,501,623 | Tate | Mar. 21, 1950 |
| 2,569,105 | James | Sept. 25, 1951 |
| 2,579,632 | Vore | Dec. 25, 1951 |
| 2,657,353 | Wiancko | Oct. 27, 1953 |
| 2,657,921 | MacBride | Nov. 3, 1953 |

FOREIGN PATENTS

| | | |
|---|---|---|
| 921,978 | France | May 23, 1947 |
| 609,816 | Great Britain | Oct. 7, 1948 |